United States Patent [19]

Braschel et al.

[11] Patent Number: 4,775,196
[45] Date of Patent: Oct. 4, 1988

[54] ANTI-SKID BRAKE SYSTEM

[75] Inventors: Volker Braschel, Neuwied; Reiner Emig, Tamm; Heinz Leiber, Oberriexingen, all of Fed. Rep. of Germany

[73] Assignee: Robert Bosch GmbH, Stuttgart, Fed. Rep. of Germany

[21] Appl. No.: 921,187

[22] Filed: Oct. 21, 1986

[30] Foreign Application Priority Data

Feb. 18, 1986 [DE] Fed. Rep. of Germany ....... 3605057

[51] Int. Cl.$^4$ .................... B60T 8/52; B60T 13/68; B60T 13/00
[52] U.S. Cl. .................... 303/115; 303/6.01; 303/113; 303/119
[58] Field of Search ............. 303/6 C, 6 R, 10, 84 A, 303/84 R, 92, 100, 103, 106, 110, 111, 113, 115, 116, 117, 119, 22 R; 188/181 A

[56] References Cited

U.S. PATENT DOCUMENTS

| | | | |
|---|---|---|---|
| 3,588,190 | 6/1971 | Gifu-shi | 303/115 |
| 3,874,745 | 4/1975 | Peruglia et al. | 303/6 R |
| 4,033,637 | 7/1977 | Leiber | 303/115 |
| 4,093,316 | 6/1978 | Reinecke | 303/100 |
| 4,358,163 | 11/1982 | Young | 303/22 R |
| 4,374,421 | 2/1983 | Leiber | 303/111 X |
| 4,446,522 | 5/1984 | Sato et al. | 303/106 X |
| 4,492,413 | 1/1985 | Belart et al. | 303/119 |
| 4,526,426 | 7/1985 | Sato et al. | 303/22 R X |

FOREIGN PATENT DOCUMENTS 1455940 1/1969 Fed. Rep. of Germany .

Primary Examiner—Andres Kashnikow
Assistant Examiner—Timothy Newholm
Attorney, Agent, or Firm—Edwin E. Greigg

[57] ABSTRACT

An anti-skid brake system has a first brake circuit (I) terminating at two wheel brakes and connected to a dual-circuit master cylinder, a brake pressure modulation valve assembly and a recirculating pump. In an anti-skid situation, in order to reduce brake pressure, fluid is withdrawn from the two wheel brakes by the brake pressure modulation valve assembly and then returned to the master cylinder by the recirculating pump. Associated with a second brake circuit (I), which is likewise connected to the master cylinder and which terminates at two other wheel brakes, is a floating piston assembly connected to the first brake circuit (I). In an anti-skid situation, a pressure reduction, which is performed in the first brake circuit (I) by the brake pressure modulation valve assembly brings about a pressure reduction in the second brake circuit (II), via the floating piston assembly.

24 Claims, 4 Drawing Sheets

ANTI-SKID BRAKE SYSTEM

BACKGROUND OF THE INVENTION

The invention is based on an anti-skid brake system as generally defined hereinafter. From U.S. Pat. No. 4,033,637, an anti-skid brake system is known in which a Brake pressure modulation valve assembly, a pressure fluid receiving reservoir and a recirculating pump are associated with a first brake circuit. A floating piston assembly is associated with a second brake circuit. The floating piston assembly includes two cylinders, a pressure modulation piston acted upon by the brake pressure of the first brake circuit for modulating the brake pressure in the wheel brakes of the second brake circuit, a barrier valve controlled by the pressure modulation piston, and a safety piston which in the event of failure of the first brake circuit keeps the pressure modulation piston in its basic position and thereby keeps the barrier valve open. During braking in which there is no danger of skidding, both pistons remain in their basic positions. As a result, if an anti-skid situation occurs after a relatively long period of inactivity, the pressure modulation piston may remain stuck in its position for lowering brake pressure. To make it possible, despite this, to supply brake pressure from the master cylinder to the wheel brakes of the second brake circuit, a safety valve embodied as an overpressure valve is disposed in a bypass around the blocking valve. In the anti-skid situation, this safety valve is intended to make the greatest possible pressure drop possible between the master cylinder and the wheel brakes. Attaining this object, however, has the disadvantage that in emergency braking, that is, if the blocking valve controlled by the pressure modulation piston is closed, the emergency braking pressure in the wheel brake cylinders is substantially less than the pressure generated in the master cylinder. As a result, in the event of emergency braking a very high master cylinder pressure is necessary, yet it may no longer be possible to generate such high pressure by means of a brake pedal alone.

OBJECT AND SUMMARY OF THE INVENTION

The anti-skid brake system according to the invention has an advantage that its floating piston assembly is more easily manufactured and is more dependable in operation, because its pistons are displaced upon each braking event and therefore remain smooth-operating. An expensive safety valve, which is necessary in the prior art and which disadvantageously lengthens emergency stopping distances, is dispensed with.

Additionally, by means of the characteristics revealed in this application, advantageous further embodiments of and improvements in the anti-skid brake system are attainable. Also disclosed herein are exemplary embodiments for effecting the refilling, bleeding and pressure equalization of the wheel brakes of the second brake circuit. A still further embodiment defined herein has the advantage that when wheel pressures in the first brake circuit are lowered, brake shoes that belong to the wheel brakes of the second brake circuit continue to be applied [to the inside of the brake drum or whatever], so that when the brake pressures are once again raised, the braking action at the wheel brakes of the second brake circuit is immediately reinstated, which results in advantageously short stopping distances. Another advantage of this invention is that brake shoes of the wheel brakes of the second brake circuit remain applied, with the result being shorter stopping distances. Still another embodiment has the advantage that the brake pressure in all the wheel brakes, for example, can be lowered and then raised back to their original levels, independently of one another.

This anti-skid brake system also has the advantage that relatively short stopping distances and sufficiently good tracking of the vehicle are attainable despite the simple design of the brake system.

Another advantage of this apparatus is that after a brake pressure reduction, to attain the shortest possible stopping distances, a control unit checks whether the stopping distances can be shortened by raising brake pressures. This is particularly advantageous if a road surface is wet, snowy or icy only in spots. A brake system of this kind also has advantages if a vehicle equipped with it has a front-wheel drive with a drag moment that may be a hindrance at the time. Still another advantage of this braking system is the improved tracking of the vehicle during braking while cornering. A still further advantage is to assure short stopping distances at times when the wheels of only one side of the vehicle are traveling on a slippery portion of the surface. This may for instance be the case when there are puddles and patches of ice at the edge of the road.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
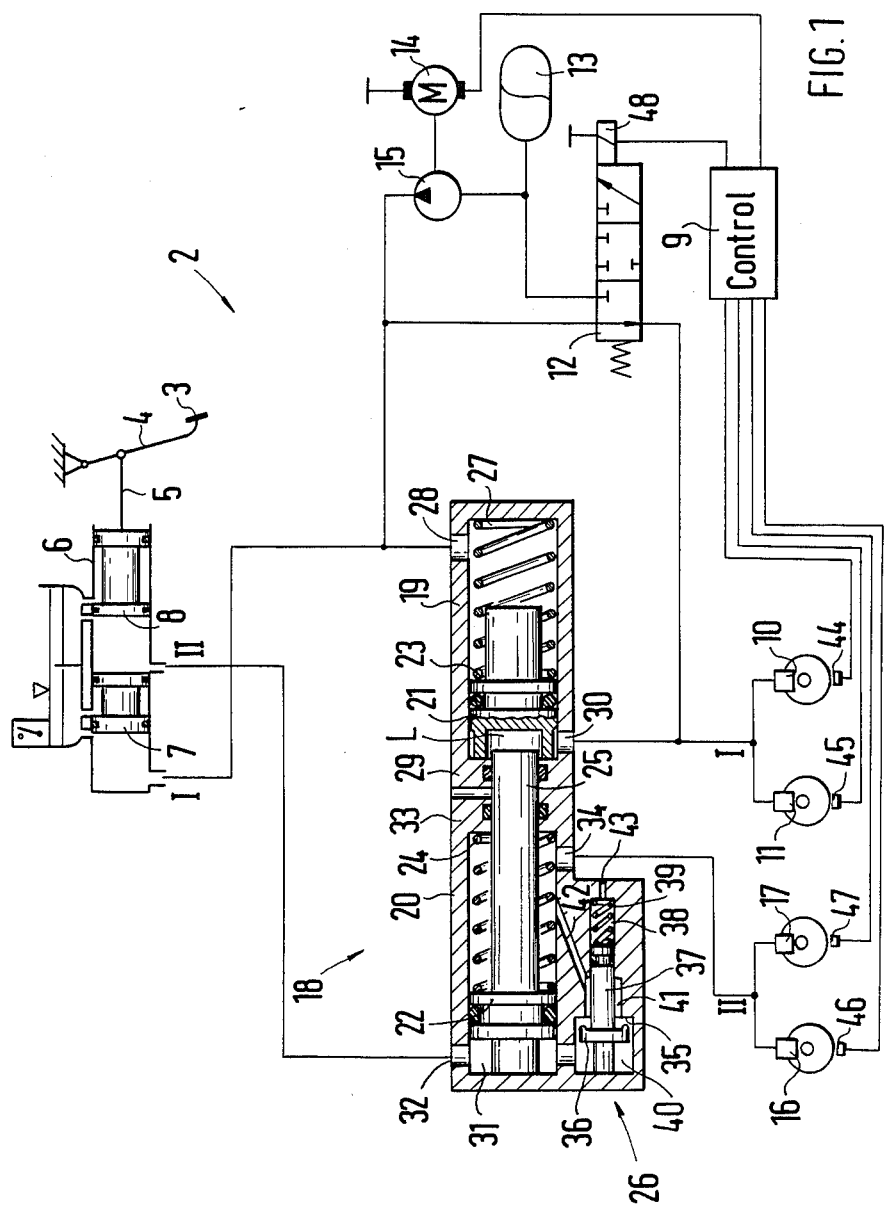
FIG. 1 shows a first exemplary embodiment of the anti-skid brake system according to the invention.

The anti-skid brake system 2 shown in FIG. 1 has a dual-circuit master cylinder 6 having two master cylinder pistons 7 and 8 and actuated by means of a brake pedal 3 via a brake pedal lever 4 and a tappet 5, and a brake circuit I, a brake circuit II and a control unit 9. Belonging to the brake circuit I are two wheel brakes 10, 11, of which one may be a front wheel brake and the other a rear wheel brake diagonally opposite to it, as well as a brake modulation valve assembly 12, a pressure fluid reservoir 13 and a recirculating pump 15 driven by a motor 14.

Between the master cylinder 6 and wheel brakes 16, 17, one of which may be embodied as a front wheel brake and the other as a rear wheel brake diagonally opposed to it, the brake circuit II has a floating piston assembly 18. This assembly 18 has a first cylinder 19, a second cylinder 20, a first piston 21, a second piston 22, a first restoring spring 23, a second restoring spring 24, and a pressure rod 25. A valve 26 that is switchable in accordance with pressure is associated with the floating piston assembly 18.

Near the end 27 of the first cylinder 19 there is a connection 28, which communicates with the brake circuit I and its portion of the master cylinder 6, so that pressure generated by means of the master cylinder piston 7 reaches the cylinder 19. One end of the first cylinder 19 has a further connection 30, which communicates with the wheel brakes 10 and 11 of the first brake circuit. The piston 21 is longitudinally displaceable in the first cylinder 19. The restoring spring 23 is supported on the end 27 of the cylinder 19 and presses the piston 21 toward the end 29, into a basic position.

The second cylinder 20 likewise has an end 31 with a connection 32, which communicates with the portion of the master brake cylinder 6 belonging to the brake circuit II. Pressure that can be generated by the master cylinder piston 8 therefore takes effect, through the connection 32, in the second cylinder 20. The cylinder 20 also has an end 33, at which a further connection 34 is located. This connection 34 communicates with the wheel brakes 16 and 17. The piston 22 is displaceable in the second cylinder 20, and its restoring spring 24 is supported on the end 33 and presses the piston toward the end 31. In the example shown, the pressure rod 25 is secured to the piston 22 or is embodied integrally therewith. The length of the pressure rod 25 is preferably selected such that whenever both pistons 21 and 22 are at rest in their basic positions, a distance for an idle stroke L exists between the pressure bar 25 and the piston 21.

The pressure-dependently closable valve 26 has a valve seat 35, an associated closing element 36, a closing piston 37, a closing cylinder 38 and an opening spring 39 as well as a valve chamber 40, in which the valve seat 35 is located and in which the closing element 36 is movable. Opposite the connection 32, the valve chamber 40 communicates with the end 31 of the second cylinder 20. The valve seat 35 is adjoined by a valve outlet 41, which communicates via a connecting conduit 42 which extends to the cylinder 20 and indirectly connects with the connection 34 near the end 33 of the cylinder 20. In the extension of the closing cylinder 38, a relief opening 43 is provided, in which ambient air pressure prevails.

The wheel brakes 10, 11 and 16, 17 have wheel rotation sensors 44, 45, 46 and 47 associated with them. These sensors are electrically connected to the control unit 9. An electromagnet 48 of the brake pressure modulation valve assembly 12 is electrically connected to the control unit 9. This brake pressure modulation valve assembly 12 is suitably embodied as a 3/3-way valve, which by means of two different current intensities can be directed into a first and second control position. Also electrically connected to the control unit 9 is the motor 14 for the recirculating pump 15. The anti-skid brake system 2 functions in the manner described as follows:

OPERATION

When the brake pedal 3 is actuated, the master cylinder piston 8 is displaced via the brake pedal lever 4 and the tappet 5. The master cylinder piston 8 generates a brake fluid pressure that acts upon the master cylinder piston 7 and continues on to the brake fluid in circuit II as well. Through the connection 32, this brake fluid under pressure reaches the second cylinder 20, and from there on, as long as this brake pressure (II) is low, it passes through the pressure-dependently closable valve 26 and the connecting conduit 42 to reach the connection 34 and from there reaches the wheel brakes 16 and 17. The pressure exerted on the master brake piston 7 generates brake pressure for the brake circuit I, which by means of the brake pressure modulation valve assembly 12 located in its basic position reaches both the wheel brakes 10 and 11 and the connection 30 and thereby reaches the first cylinder 19. The brake pressure generated by the master cylinder piston 7 also, however, reaches the connection 28 of the first cylinder 19, so that in the described basic position of the brake pressure modulation valve assembly 12, the piston 21 is acted upon from both directions with the same pressure.

As long as the pressure generated in the master cylinder 6 by means of the brake pedal 3 is low enough, the pressure-dependently closable valve 26 stays open. If the brake pedal 3 is now actuated harder, then pressures in the wheel brakes 10, 11, 16 and 17 increase to such an extent that brake shoe linings, not shown, are applied to the brake disks or brake drums, also not shown, of these wheel brakes. At this time the two pistons 21 and 22 are still in their basic positions shown in FIG. 1. The opening force of the opening spring 39 is selected such that upon further-increasing actuation force at the brake pedal 3, the fluid pressure prevailing in the valve chamber 40 displaces the closing piston 37 counter to the opening spring 39, and as a result the closing element 36 is applied sealingly against the valve seat 35. As a consequence, the possibility of bypassing the piston 22, which existed until now, is interrupted, and, as the actuation force at the brake pedal 3 increases still further, the piston 22 is displaced in the direction of the end 33 and positively displaces pressure fluid through the connection 34 to the wheel brakes 16 and 17, causing the pressures in them to rise once again. At the same time, through the brake pressure modulation valve assembly 12, the pressures in the wheel brakes 10 and 11 also rise. Because of the displacement of the piston 22, the pressure rod 25 presses against the piston 21 and displaces it counter to the force of the restoring spring 23. Because the brake pressure modulation valve assembly 12, its basic position, provides a bypass around the piston 21, the displacement of the piston 21 is not hindered by pressure fluid.

During braking events, the wheel rotation sensors 44–47 signal the wheel rotation angle to the control unit 9. On the basis of the signaled wheel rotation angle, this control unit ascertains whether overbraking of one or more of the wheels associated with the wheel rotation sensors is occurring. Overbraking of the wheels means there is the danger of wheel locking, or skidding, which must be suppressed at least at those wheels that are necessary for proper tracking of the vehicle during braking. For this reason, the control unit 9 is equipped in such a way, and if it contains a digital computer used for control operations, it is also programmed in such a way that a brake pressure reduction command reaches the electromagnet 48 of the brake pressure modulation valve assembly 12, whenever one front wheel, or both front wheels, or both rear wheels, or both front wheels and one rear wheel are overbraked. Directing the brake pressure modulation valve assembly 12 into its brake pressure reduction position and at the same time switching on the motor 14 of the recirculating pump 15, which is also performed by the control unit 9, have the effect that pressure fluid is withdrawn from the wheel brakes 10 and 11 and from the connection 30 of the cylinder 19 and pumped to the master cylinder 6 and to the connection 28 of the cylinder 19. The wheel brake forces at the wheel brakes 10 and 11 consequently decrease, so that their wheels are accelerated. The pressure fluid pumped to the connection 28 acts upon the first piston 21 in the same direction as the force of the restoring spring 23.

Because at the same time the action on the opposite end of the piston 21 is lessening, in the same manner as the brake pressure in the wheel brakes 10 and 11 is dropping, the result at the piston 21 is a displacement force that via the pressure rod 25 engages the piston 22, displacing it toward the connection 32. As a result, the piston 22 will positively displace pressure fluid through the connection 32 to the master cylinder 6. At the same time, quantities of pressure fluid flow out of the wheel brakes 16 and 17 in the wake of the piston 22, so that the brake pressures in the wheel brakes 16 and 17 drop in the desired manner as well.

If the situation is such that at first all the wheels are being overbraked, and then in response to an above-described brake pressure reduction only the rear wheels begin to grip, while the front wheels continue to be overbraked, then the control unit 9 directs the pressure prevailing in the master cylinder into the wheel brakes 10 and 11, and also into the wheel brakes 16 and 17 via the floating piston assembly 18, for a preselectable period of time. This produces an increase in the braking force, for instance if two front wheels have encountered puddles of water and as a result are briefly without a gripping contact with the road surface. This kind of temporary pressure elevation is also advantageous if the overbraking of the front wheels, when driving over puddles, for example, had been dictated by the drag moment of a front-wheel drive motor.

In addition, or alternatively, the control unit 9 can also be so equipped and/or programmed that after a brake pressure reduction directed by it, it increases the brake pressure slowly whenever it recognizes that although two wheels on one side of the vehicle are being overbraked, two other wheels belonging to the other side of the vehicle are still not being braked hard enough because they are traveling on a surface with very good grip. This embodiment or programming of the control unit 9 results in very short stopping distances in the case where the wheels on the side of the vehicle toward the edge of the road are riding on ice or in deep puddles. The brake pressure elevation in question is performed slowly, to give the driver enough time to make steering corrections, perhaps necessitated by yawing moments that may have arisen, in good time.

The anti-skid brake system 2 according to the invention, because of its simple design, is preferably intended for installation in front-wheel drive vehicles of the lower price class and an exemplary embodiment of the control unit 9 can also be equipped and/or programmed such that, after a brake pressure reduction directed by it that has sufficed for eliminating the danger of wheel lock at both front wheels and one rear wheel, it effects a brake pressure elevation until one of the two front wheels is again overbraked. It is in fact in vehicles of this category that the situation in which a rear wheel on the inside of a turn is overbraked arises most often. The overbraking is mostly caused by centrifugal force acting upon a relatively high vehicle center of gravity and by relatively short wheelbases. Overbraking of a rear wheel and the resultant worsening of vehicle tracking at the back result in a faulty moment about the vertical axis of the vehicle, which would make it difficult to steer the vehicle along a prescribed path. As a result, a decrease in the guidance force of the rear wheel on the inside of the turn is approximately compensated for by the above-mentioned slow brake pressure increase and the resultant reduced tracking force of the front wheel on the inside of the turn.

Instead of the brake pressure modulation valve assembly 12 shown as a 3/3-way valve, it is naturally possible instead to install a brake pressure modulation valve assembly comprising two separate 2/2-way valves as found in the prior art.

Figure 2:
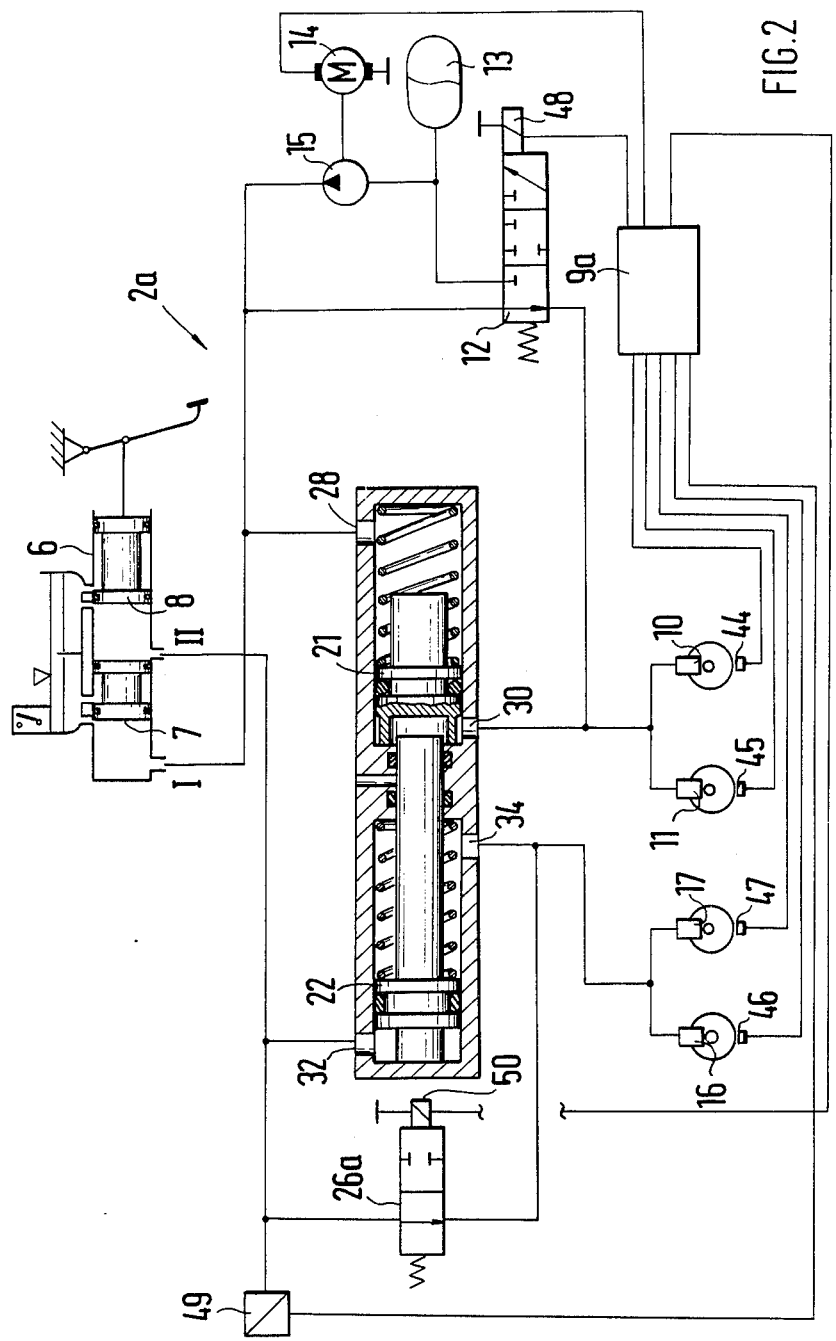
FIG. 2 shows a second exemplary embodiment of the brake system according to the invention.

The second exemplary embodiment of an anti-skid braking system 2a according to FIG. 2 differs from the exemplary embodiment of FIG. 1 substantially in that instead of the valve 26 that is blockable by hydraulic pressure, an electrogmagnetically controlled valve 26a is used. So that this valve 26a will also be controllable as a function of the pressure prevailing in the master cylinder 6, a pressure sensor 49 is connected to the master cylinder 6. As compared with the control unit 9 of the first exemplary embodiment, a control unit 9a is further developed here such that it can make use of electrical indications from the pressure sensor 49 for blocking the valve 26a, by means of an electromagnet 50 associated with this valve. As will be appreciated from the description, the valve 26a is open in its basic position. As a result, it is for instance possible to bleed the wheel brakes 16 and 17 of the brake circuit II through the valve 26a.

Figure 3:
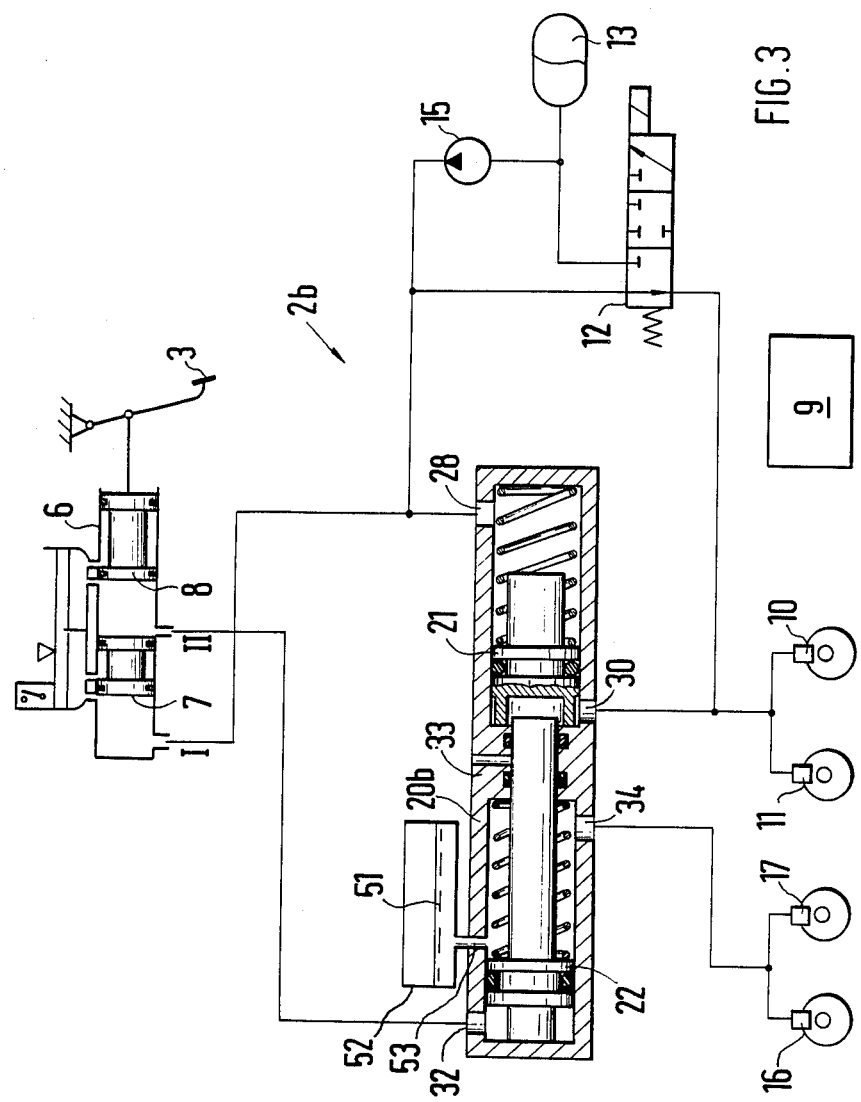
FIG. 3 shows a third exemplary embodiment.

A further exemplary embodiment of the antiskid brake system 2b as shown in FIG. 3 does not need any blockable valves 26 or 26a as in the first two exemplary embodiments described, because the cylinder 20b has a pressure equalization container 52 that keeps a supply of pressure fluid 51, furnishing the pressure fluid 51 for the wheel brakes 16 and 17 via a connection embodied as a breather bore 53. The breather bore 53 is disposed relative to the connection 34 of the cylinder 22b such that the pressure equalization container 52 communicates with this connection 34 whenever the piston 22 is in its basic position. If the brake pedal 3 is actuated, so that pressure is generated in the master cylinder 6, then this pressure displaces the piston 22 toward the connection 34, in the course of which the piston 22 overtakes the breather bore 53. As soon as the breather bore 53 has been overtaken, braking pressure is produced ahead of the piston 22, extending on through the connection 34 to the wheel brakes 16 and 17. Bleeding of the wheel brakes 16 and 17 is accordingly possible by using the pressure fluid 51 that is located in the pressure equalization container 52. The brake pressure modulation valve assembly 12, the pressure fluid reservoir 13 and the recirculating pump 15 are taken from the first two exemplary embodiments and so need no further description. The control unit 9 is equivalent to that of the first exemplary embodiment and controls the brake pressure reductions and the re-elevations of the brake pressures in the same way as described for the first exemplary embodiment.

Figure 4:
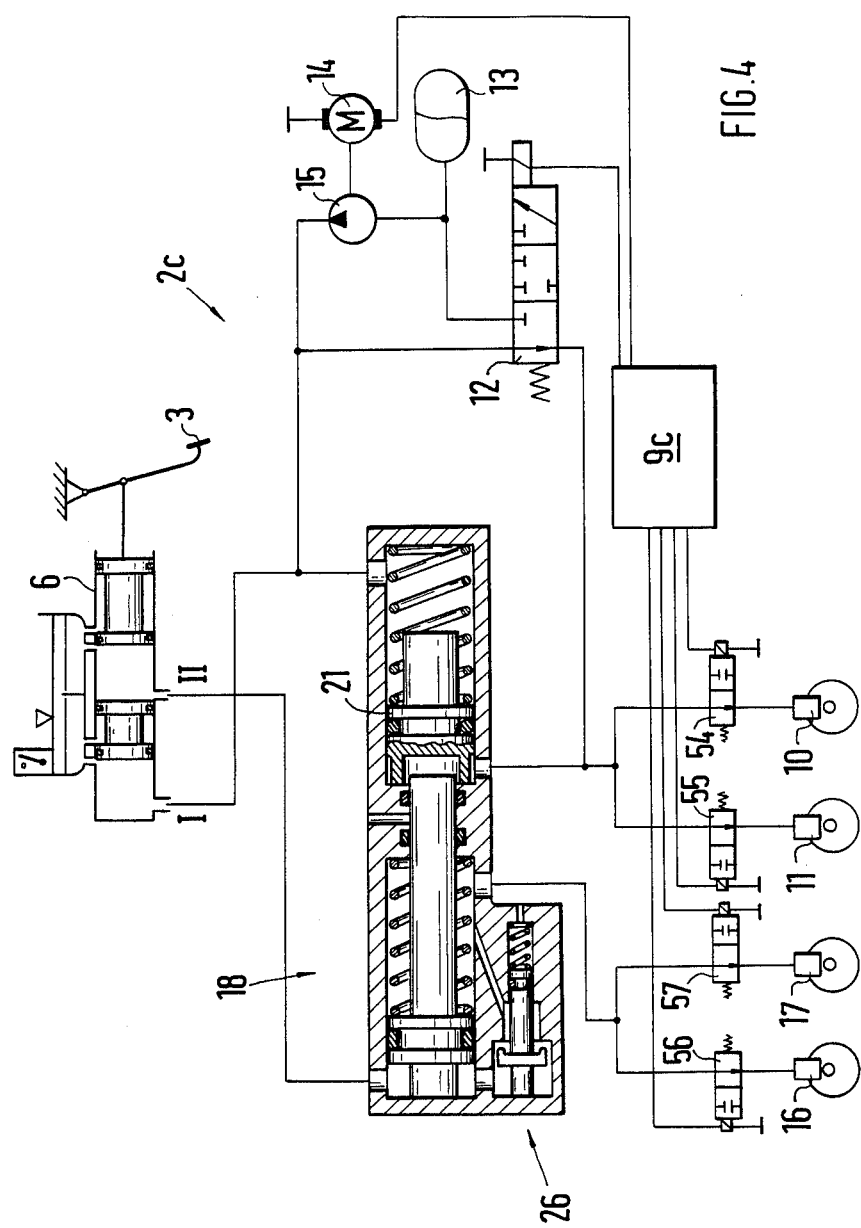
FIG. 4 shows a fourth exemplary embodiment, which includes a further refinement of the first exemplary embodiment.

In the fourth exemplary embodiment of an anti-skid brake system 2c, the master cylinder 6, the brake pressure modulation valve assembly 12, the pressure fluid reservoir 13, the recirculating pump 15, the floating piston assembly 18, the valve 26, and the wheel brakes 10, 11, 16, 17 are all the same as in the first exemplary embodiment. However, the anti-skid brake system 2c according to FIG. 4 includes additional blocking valves 54, 55, 56 and 57, which are disposed in the brake circuits I and II preceding the wheel brakes 10, 11, 16 and 17. A control unit 9c is further developened in such a way that it can direct these blocking valves 54–57 out of their basic positions, in which they are open, into their blocking positions. By means of the blocking valves 54–57, brake pressures in any wheel brakes the wheels which are not being overbraked, which can be kept constant, while by keeping the blocking valves open and triggering the brake pressure modulation valve assembly 12, brake pressures can be reduced in the wheel brakes that are braking their wheels too hard. Thus by means of the arrangement of the blocking valves 54–57, a relatively inexpensive anti-skid brake system according to FIG. 1 is further developed into an anti-skid brake system operating for all four wheels. It should also be noted that by means of the valves 54–57, the exemplary embodiments of FIGS. 2 and 3 can also be further developed, into four-channel anti-skid brake systems, for example. An intermediate embodiment, not shown, between the exemplary embodiment of FIG. 1 and the exemplary embodiment of FIG. 4 has only one such blocking valve preceding the wheel brakes of one brake circuit, which is less expensive. It is possible, for instance, to assign one front wheel brake and one diagonally opposed rear wheel brake to one blocking valve. On the other hand, it is also possible to connect a pair of front wheel brakes, or a pair of rear wheel brakes, to one such blocking valve in a manner known per se.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. An anti-skid brake system having a dual-circuit master cylinder which applies pressure to a brake fluid for first and second brake circuits, said first brake circuit having a brake pressure modulation valve assembly and a recirculating pump associated therewith, said second brake circuit having a floating piston assembly operable in an anti-skid situation to lower brake pressure in said second brake circuit and being controlled by the brake pressure of the first brake circuit, said floating piston assembly includes first and second axially aligned cylinders with axially aligned first and second pistons therein, a pressure rod disposed between said first and second piston; wherein:

said first cylinder (19) of said floating piston assembly (18) has a first end (27), which communicates with a master cylinder connection associated with the first brake circuit (I), and has a second end (29), which communicates with a pair of wheel brakes (10, 11) associated with said first brake circuit (I), and said first cylinder (19) contains a restoring spring (23) which displaces said first piston (21) toward said second end (29) of said first cylinder;

said brake pressure modulation valve assembly (12), in its open position, provides a bypass around said first cylinder (19) and thereby connects its first end (27) with its second end (29) on opposite sides of said first piston (21);

said second cylinder (20) has a first end (33), which adjoins said second end (29) of said first cylinder (19) and communicates with wheel brakes (16, 17) of said second brake circuit (II), and has a second end (31) which communicates with a connection of said master cylinder (6) which connection is associated with said second brake circuit (II), and said second cylinder (20) contains a restoring spring (24) which displaces said second piston (22) toward said second end (31) of said second cylinder (20); and said anti-skid brake system includes pressure equalization means operatively connected to said second cylinder when said master cylinder is not actuated and said first and second pistons are in their basic positions and being operable to adapt the pressure of the wheel brakes of the second brake circuit to be no higher than the pressure prevailing in the master cylinder.

2. An anti-skid brake system as defined by claim 1, in which said pressure equalization device comprises an electrically closable valve means which is open in its basic position and thereby connects said second end (31) of said second cylinder with said first end (33) of said second cylinder.

3. An anti-skid brake system as defined by claim 1, in which said pressure equalization device comprises a hydraulically controlled valve means, which in its basic position is open and thereby forms a bypass which bypasses said second piston (22) of said second cylinder (20), leading from a master cylinder portion of said second brake circuit to its wheel brake (16, 17), and is closable with pressure from said master cylinder (6).

4. An anti-skid brake system as defined by claim 1, in which said pressure equalization device includes an equalization container (52) which maintains a supply of pressure fluid (51) with a connection (53), which in the basic position of said second piston (22) is open and connects via said second cylinder (20b) to the wheel brakes (16, 17).

5. An anti-skid brake system as defined by claim 1, in which an axial space exists between said pressure rod (25) of said second piston (22) and said first piston, providing means for an execution of an idle stroke (L) in which said axial space is closed by movement of said second piston when said second piston is acted upon by pressure from the master cylinder (6) before said pressure rod acts upon said first piston (21).

6. An anti-skid brake system as defined by claim 2, in which an axial space exists between said pressure rod (25) of said second piston (22) and said first piston, providing means for an execution of an idle stroke (L) in which said axial space is closed by movement of said second piston when said second piston is acted upon by pressure from the master cylinder (6) before said pressure rod acts upon said first piston (21).

7. An anti-skid brake system as defined by claim 3, in which an axial space exists between said pressure rod (25) of said second piston (22) and said first piston, providing means for an execution of an idle stroke (L) in which said axial space is closed by movement of said second piston when said second piston is acted upon by pressure from the master cylinder (6) before said pressure rod acts upon said first piston (21).

8. An anti-skid brake system as defined by claim 4, in which an axial space exists between said pressure rod (25) of said second piston (22) and said first piston, providing means for an execution of an idle stroke (L) in which said axial space is closed by movement of said second piston when said second piston is acted upon by pressure from the master cylinder (6) before said pressure rod acts upon said first piston (21).

9. An anti-skid brake system as defined by claim 2, in which said valve means is arranged such that said valve closes whenever a pressure prevailing in said master cylinder (6) exceeds a pressure level that suffices for applying brake linings to brake disks or brake drums.

10. An anti-skid brake system as defined by claim 3, in which said valve means is arranged such that said valve closes whenever a pressure prevailing in said master cylinder (6) exceeds a pressure level that suffices for applying brake linings to brake disks or brake drums.

11. An anti-skid brake system as defined by claim 9, in which said valve means is electromagnetically controlled, and a pressure sensor (49) connected to said master cylinder (6) is associated with said valve means for controlling said valve means.

12. An anti-skid brake system as defined by claim 10, in which said valve means is electromagnetically controlled, and a pressure sensor (49) connected to said master cylinder (6) is associated with said valve means for controlling said valve means.

13. An anti-skid brake system as defined by claim 2, in which said valve means is hydraulically closable with pressure from said master cylinder (6).

14. An anti skid brake system as defined by claim 3, in which said valve means is hydraulically closable with pressure from said master cylinder (6).

15. An anti-skid brake system as defined by claim 1, which includes blocking valve means built between said floating piston assembly (18) and said wheel brakes (10, 11, 16, 17), for maintaining brake pressures constant in at least one wheel brake that is not effecting overbraking, while in at least one other wheel brake that is overbraking, a brake pressure reduction takes place.

16. An anti-skid brake system as defined by claim 2, which includes blocking valve means built between said floating piston assembly (18) and said wheel brakes (10, 11, 16, 17), for maintaining brake pressure constant in at least one wheel brake that is not effecting overbraking, while in at least one other wheel brake that is overbraking, a brake pressure reduction takes place.

17. An anti-skid brake system as defined by claim 3, which includes blocking valve means built between said floating piston assembly (18) and said wheel brakes (10, 11, 16, 17), for maintaining brake pressure constant in at least one wheel brake that is not effecting overbraking, while in at least one other wheel brake that is overbraking, a brake pressure reduction takes place.

18. An anti-skid brake system as defined by claim 4, which includes blocking valve means built between said floating piston assembly (18) and said wheel brakes (10, 11, 16, 17), for maintaining brake pressure constant in at least one wheel brake that is not effecting overbraking, while in at least one other wheel brake that is overbraking, a brake pressure reduction takes place.

19. An anti-skid brake system as defined by claim 5, which includes blocking valve means built between said floating piston assembly (18) and said wheel brakes (10, 11, 16, 17), for maintaining brake pressure constant in at least one wheel brake that is not effecting overbraking, while in at least one other wheel brake that is overbraking, a brake pressure reduction takes place.

20. An anti-skid brake system as set forth in claim 1, comprising a brake pressure modulation valve assembly that acts on all wheel brakes simultaneously, a control unit that controls said brake pressure modulation valve assembly, wheel rotation sensors associated with each of said wheel brakes that monitors wheel revolutions and which in an anti-skid situation controls said brake pressure modulation valve assembly, a control unit means which controls brake pressure reductions whenever all the wheels are being overbraked.

21. An anti-skid brake system as defined by claim 20, in which said control unit means is embodied such that following a pressure reduction controlled by said control valve in response to a danger of skidding at all wheels, said control valve returns said brake pressure modulation valve assembly (12) back to its basic position during a predetermined period of time, so as to adapt prevailing brake pressure at least partially to an original brake pressure as soon as the number of skid-threatened wheels has decreased by at least one.

22. An anti-skid brake system as defined by claim 20, in which said control unit means is operative such that after a brake reduction controlled by said control unit means which has led to underbraking of both front wheels and one rear wheel, said control unit means directs the brake pressure modulation valve assembly (12) into its basic position until such time as one front wheel is overbraked.

23. An anti-skid brake system as defined by claim 20, in which said control unit means is operative such that after a brake pressure reduction controlled by said control unit means, said control unit means increases the brake pressure again slowly whenever two wheels on one side of the vehicle are overbraked and when two wheels on the other side of the vehicle are underbraked.

24. An anti-skid brake system as set forth in claim 1 in which said pressure equalization means is operatively connected to said second end of said second cylinder.

* * * * *